Dec. 20, 1949  H. E. MEYER  2,491,997

BATTERY HOLD-DOWN CLAMP

Filed Dec. 23, 1946

INVENTOR.
Harvey E. Meyer
BY
ATTORNEY.

Patented Dec. 20, 1949

2,491,997

UNITED STATES PATENT OFFICE 2,491,997

BATTERY HOLD-DOWN CLAMP

Harvey E. Meyer, Blue Springs, Mo.

Application December 23, 1946, Serial No. 717,964

1 Claim. (Cl. 180—68.5)

This invention has to do with a hold down clamp for positively holding a storage battery for automobiles or the like in a solid and virtually immovable condition when the same is operably associated with the automobile.

One of the most difficult problems in the field of providing storage batteries for automobiles or other mobile structures, is to provide a satisfactory and sturdy means for holding the battery in place to the end that the same will not become damaged through jars and jolts as the automobile travels.

Many of various types of clamping means have heretofore been designed and used but all are undesirable because the same soon become corroded through chemical acids emanating from the battery through rust and breaking generally. It is, therefore, the primary object of this invention to provide a battery hold down clamp which is extremely strong, inexpensive to manufacture, easily mounted and removed from operative position associated with the battery and which is adapted for re-use after many removals thereof to release the battery for replacement, re-charging or the like.

The most important object of this invention is to provide a battery hold down clamp comprising a body formed by a continuous band circumscribing the uppermost edge of the battery and having a flange portion of a part thereof which is disposed in overlapping relation as a part of the uppermost wall of the battery when the same is in operative use.

Another important object of this invention is to provide a battery hold down clamp having a continuous band circumscribing a portion of the battery which band is substantially L-shaped in cross sectional contour to the end that one leg thereof girths the side and end walls of the battery and the other leg is disposed in overlapping bearing contact with the marginal portion of the uppermost face of said battery and the provision of a pair of opposed loop members for receiving tie rods or the like extending upwardly from a supporting plate or other framework for the battery in underlying relation therewith.

Other objects include the unique manner of forming a blank from which the continuous band is made; the manner in which the free ends of said continuous band are interconnected; and the way in which a number of notches are formed in one edge of said blank to present lines of bend to facilitate the formation of said continuous band.

Referring more specifically to the drawing.

Figure 1:
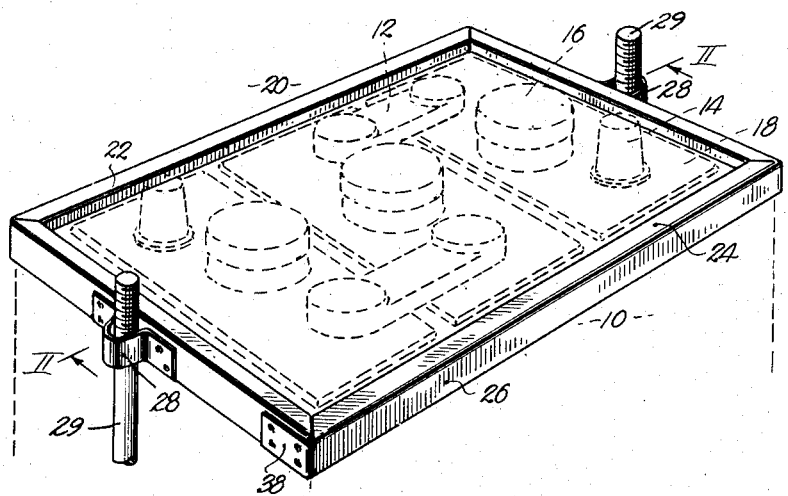
Fig. 1 is a perspective view of the battery hold down clamp made in accordance with my present invention and showing the same in association with a fragmentary view of a battery, the battery being shown in dotted lines with the tie rods in full lines.

The numeral 10 designates broadly a battery of the conventional type having the usual connecting bars 12, the positive and negative posts 14 and the caps 16 for closing the filling apertures of the battery, all disposed upon the uppermost face 18 of battery 10. It is clear therefore, that any means for holding the battery 10 in position upon a supporting structure, must necessarily leave virtually the entire upper face 18 of battery 10 clear to the end that the posts 14 and the caps 16 are left exposed and always accessible.

The hold down clamp forming a part of this invention accomplishes this purpose and constitutes a continuous band broadly designated by the numeral 20. This band is L-shaped in cross sectional contour and when formed in the manner illustrated in Fig. 1, presents a polygonal opening 22 which is in encircling relation with all of the above described parts on the uppermost face 18 of battery 10 with coplanar legs or flanges 24 thereof extending inwardly from the outermost edge of battery 10 and in overlapping relation with the face 18. The other legs 26 of the band 20 extend downwardly from the legs 24 along the side and end walls of battery 10 and in circumscribing relation with the said side and end walls.

Rigidly secured to that portion of leg 26 of band 20 constituting the ends walls of the hold down clamp, is a pair of loop members 28. These members 28 are secured to the leg 26 in any suitable manner and preferably by spot welding as is clear in Fig. 1. When the clamp comprising band 20 and the loop members 28 is disposed in the operative position illustrated in Fig. 1, a pair of fastening devices such as tie rods 29 extending upwardly along the ends of battery 10 from a supporting member (not shown) underlying the battery, passes through each of the loop members 28 respectively and is secured in place by conventional means such as a nut or the like (also not shown) threaded upon the tie rods and disposed above the loop members 28. In other words, these tie rods constitute merely bolts having one end thereof secured or passing through perforations formed in the underlying support and having the opposite ends thereof passing through loop members 28 whereupon a nut is attached thereto in screw-threaded engagement therewith.

It is clear therefore, that when such tie rods are so associated with the hold down clamp just described, the battery 10 will be held against movement by virtue of the legs or flanges 24 of band 20 bearing against face 18 of battery 10 and the legs 26 holding the battery against any lateral displacement. In other words, the size of the band 20 is such that the legs 26 thereof tightly circumscribe the side and end walls of battery 10 and the legs or flanges 24 have continuous bearing contact along the entire length of the margins of the face 18 of the battery.

Figure 2:
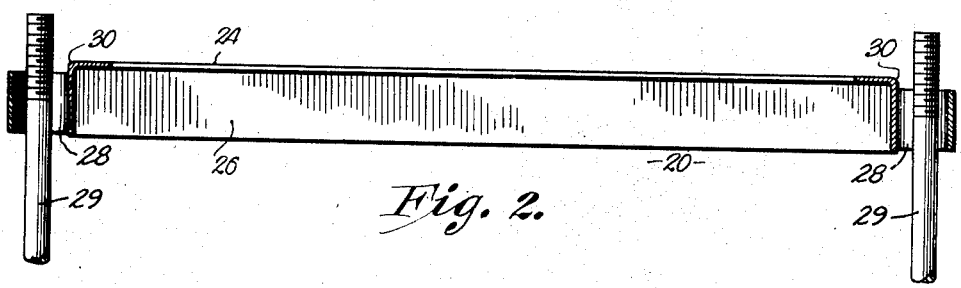
Fig. 2 is a substantially central longitudinal cross sectional view taken on line II—II of Fig. 1.
Figure 3:
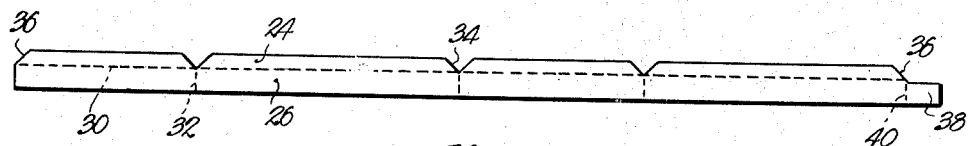
Fig. 3 is a plan view of the blank for the band forming a part of the battery hold down clamp.

Fig. 2 of the drawing clearly illustrates the blank from which the band 20 forming a part of the battery hold down clamp is formed. This band constitutes a relatively narrow sheet of initially flat material and is provided with a longitudinal line of bend 30 disposed intermediate the longitudinal edges thereof and substantially midway to set off the legs 24 and 26 of the band 20. A number of transverse lines of fold 32 also form a part of the blank shown in Fig. 3 for setting off the ends and sides of the leg 26 of band 20. Extending inwardly from the longitudinal edge of the blank defining one edge of the leg 24 are a plurality of V-shaped notches 34 which notches 34 terminate at the longitudinal line of bend 30.

It is clear that when the blank is folded on the line of bend 30 and lines of fold 32 to the shape and contour illustrated in Fig. 1, the two edges of the notches 34 which separate the legs or flanges and the inclined edges 36 formed at each end of the strip provide miter-shaped abutting ends to form a continuous bearing face. When forming the blank just described, one end of the leg 26 is extended beyond the proximal end of leg 24 to present a flap 38 defined by a line of fold 40. This flap 38 when folded at 40 overlaps the opposite end of this leg 26 and is spot welded or otherwise secured thereto as is clear in Fig. 1.

After so forming the blank and bending the same to the polygonal shape shown in Fig. 1 and securing the flap 38 in place, the loop members 28 are affixed to the band 20. It is obvious that when the hold down clamp is applied the legs or band portions 26 form a continuous girth about the battery and that the inwardly directed coplanar flanges engage the upper marginal face of the battery to enhance rigidity of the band portions. It is also obvious that the flanges having the miter-shaped abutting ends form a continuous bearing face against the marginal portion of the upper face of the battery so as to distribute pressure effected by the fastening devices or tie rods 29 around the entire margin of the battery.

While only one form of my present invention has been described and illustrated, it is understood that many changes in details of construction may be made without departing from the spirit of the invention and scope of the appended claim.

Having thus described the invention, what is claimed as new and desired to be secured by Letters Patent is:

A battery hold down clamp adapted to girth the upper portion of a battery and comprising a sheet metal strip having a longitudinal bend and spaced notches extending inwardly from one side edge to said bend in registry with transverse bends extending from the longitudinal bend to the opposite side edge of said strip to provide flange and band portions with one of the endmost band portions terminating in a flap overlying the other endmost band portion and secured thereto for joining said ends to form a continuous girth about the battery with said band portions extending along the length of and in close relation with the side and end walls of the battery and with said flange portions in coplanar relation and directed inwardly from and coextensive with said band portions and having flat underfaces adapted to overlap and directly contact the marginal portions of the upper face of the battery along the entire length of said flange portions to enhance the rigidity of the band portions, and loop members fixed to outer sides of opposite band portions for receiving fastening devices to anchor the hold down clamp, said notches being miter-shaped to form abutting unconnected ends for said flanges in a common plane for independent movement of said flanges so that the flat underfaces conform with the marginal portions of the upper face of the battery and provide continuous bearing contact around said marginal portions for distributing pressure effected by the fastening devices.

HARVEY E. MEYER.

REFERENCES CITED

The following references are of record in the file of this patent:

UNITED STATES PATENTS

| Number | Name | Date |
| --- | --- | --- |
| 820,896 | Van Patten | May 15, 1906 |
| 2,170,325 | Harrison | Aug. 22, 1939 |
| 2,306,833 | Thannhauser | Dec. 29, 1942 |

FOREIGN PATENTS

| Number | Country | Date |
| --- | --- | --- |
| 95,441 | Switzerland | July 1, 1922 |